HIGH-FREQUENCY MODULATING SYSTEM

Filed March 24, 1945

INVENTORS
WILLIAM W. HANSEN
RUSSELL H. VARIAN
BY Paul B. Hunter,
ATTORNEY

Patented Feb. 26, 1952

2,586,816

UNITED STATES PATENT OFFICE 2,586,816

HIGH-FREQUENCY MODULATING SYSTEM

William W. Hansen and Russell H. Varian, Garden City, N. Y.; Olive D. Ross, executrix of said William W. Hansen, deceased, assignor to The Sperry Corporation, a corporation of Delaware Application March 24, 1945, Serial No. 584,660

13 Claims. (Cl. 332—25)

This invention relates, generally, to the control of ultra high frequency electron beam velocity modulating tubes of the type disclosed in U. S. Patent No. 2,242,249, entitled "Electrical Converter," issued May 20, 1941, in the names of Sigurd F. Varian and William W. Hansen, and more specifically to novel modulation means by which pure amplitude or frequency modulation can be obtained using such velocity modulation tubes.

The present application is also a continuation-in-part of our copending application Serial No. 470,678 for High Frequency Modulating System, filed December 30, 1942, now Patent No. 2,482,766, dated September 27, 1949.

As is shown in U. S. Patent No. 2,281,935, entitled "Modulation System," issued May 5, 1942, in the names of Russell H. Varian and William W. Hansen, electron beam velocity modulating tubes may have their carrier outputs modulated by signal frequencies. The most generally employed methods of modulation have been either to insert the signal voltage in series with the beam acceleration voltage or to supply the signal voltage to a fine wire mesh control grid interposed between the cathode and the entrance grid of the first resonator of the tube. If the action takes place in an oscillator tube, frequency as well as amplitude modulation will result.

One cause of frequency modulation depends on the well known fact that a space filled with electrons has a dielectric constant which differs from the dielectric constant of free space. A variation of the electron beam current by a signal voltage on the control grid alters the dielectric constant of the resonators through which the beam passes thus changing the effective tuning capacity and introducing a frequency change. A second source of frequency modulation lies in the change of phase between the driving voltage and the feedback voltage when the beam velocity is altered by a signal voltage in series with the beam acceleration voltage. The condition that oscillation occurs when the phase angle around the complete regenerative circuit is equal to some integral number times $2\pi$ radians, indicates that any change in the transit time in the bunching space due to changes in acceleration voltage must be accompanied by a change in the phase angle between "buncher" and "catcher" resonators. This implies a frequency change accompanying the change in acceleration voltage. It is to be understood that frequency modulation will not occur in a modulated amplifier which is isolated from the oscillator by a buffer resonator. This procedure is, however, often undesirable since three more resonators are added which complicate the apparatus and greatly increase the tuning problem.

On the other hand, under some circumstances, due to the sharpness of the resonance curves of the resonators themselves, it is difficult to produce a pure frequency-modulated carrier without simultaneous amplitude modulation.

It has been disclosed in above-mentioned Patent No. 2,281,935, that pure amplitude modulation or pure frequency modulation may be obtained by using combinations of acceleration voltage modulation and beam current modulation of the proper amount and in the correct phase relationship. This has the disadvantage, however, that acceleration voltage modulation requires a large signal amplitude and abstracts power from the signal source.

It is, therefore, the principal object of the present invention to provide means for obtaining, as desired, either amplitude or frequency modulation in ultra high frequency oscillators of the electron beam velocity modulating type without the simultaneous occurrence of the undesired form of modulation.

Another object is to provide means for obtaining pure amplitude or pure frequency modulation with moderate amplitude signals and negligible signal power consumption by impressing the signal upon the control grids of a plurality of electron beams coacting with coupled electromagnetic fields.

Still another object is to modify the modulation characteristics of an electron beam velocity modulating tube by altering the dielectric constant within one or more resonators of the device with one or more auxiliary electron beams.

A further object of the present invention lies in the provision, in an ultra high frequency electron beam velocity modulating tube, of an auxiliary electron beam or beams adapted to maintain the average electron density within common resonator or resonators substantially constant when the average electron density of the main electron beam is modulated by a signal voltage.

A still further object lies in the provision, in an ultra high frequency electron beam velocity modulating tube, of an auxiliary beam or beams adapted to vary the average electron density within a common resonator or resonators at a signal frequency while the average electron density of the main electron beam remains substantially constant.

Another object is to provide means in an ultra high frequency tube of the character described for selectively obtaining either pure amplitude modulation or pure frequency modulation by a simple operational adjustment.

Yet a further object is to provide, in an electron beam velocity modulating oscillator having a cavity resonator, means for controlling the average electron density within the resonator in accordance with a signal wave either to produce or to compensate for changes in the resonant frequency of the oscillator without imparting energy to the high frequency field therein, comprising means for projecting an electron beam through the high frequency field of the resonator, and grid means for controlling the beam current, the beam being so directed as to be collected by the side of the resonator or other collector means without providing feedback coupling with the field.

Other objects and advantages will become apparent from the specification, taken in connection with the accompanying drawings wherein the invention is embodied in concrete form.

In the drawings.

Similar characters of reference are used in all of the above figures to indicate corresponding parts.

Figures 1, 2, 3:
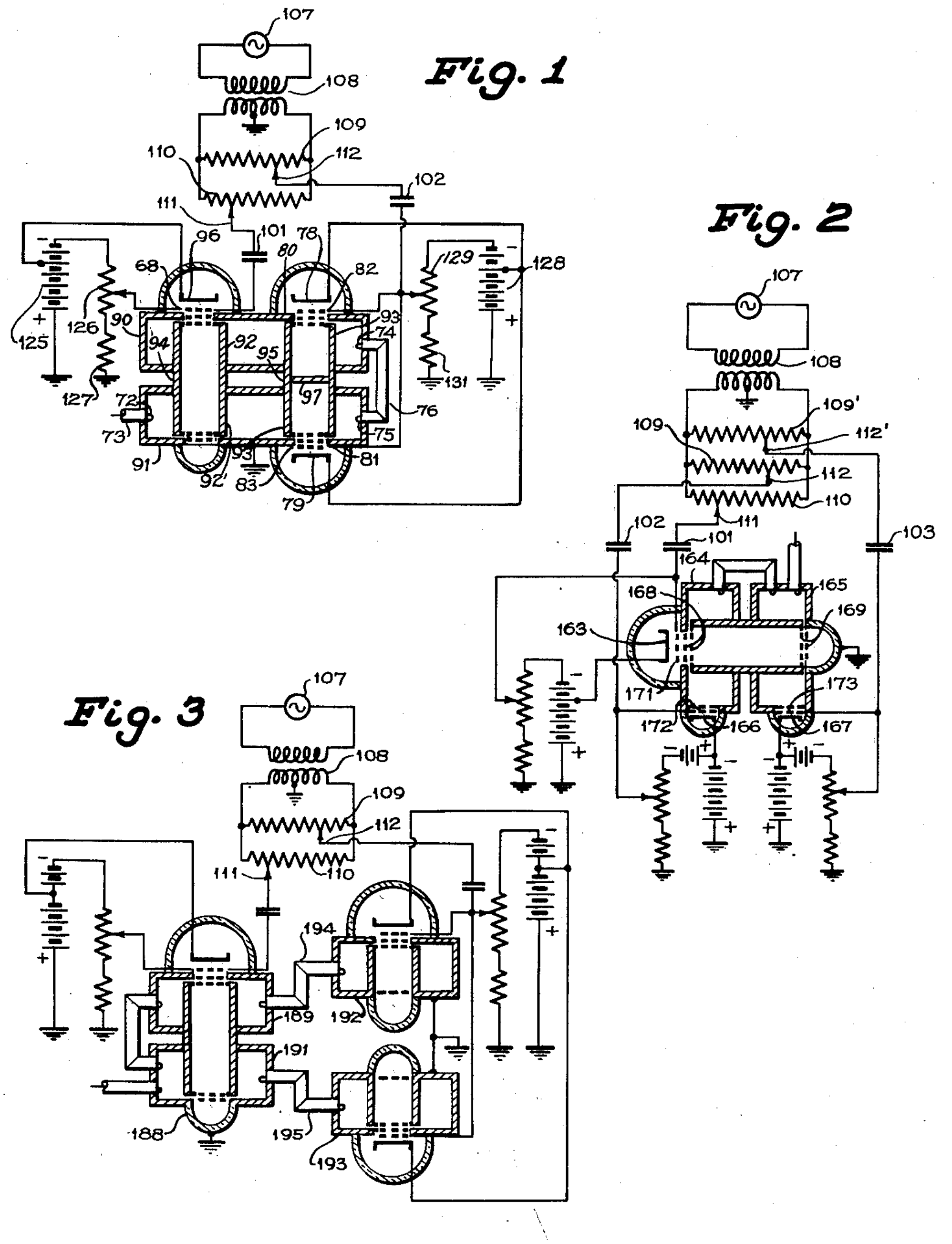
Fig. 1 is a schematic wiring diagram of one form of our invention.
Figs. 2 and 3 are schematic wiring diagrams of modifications of the invention.

It has been demonstrated mathematically and verified experimentally that the presence of free electrons within an electric field may either increase or decrease the dielectric constant of the space containing these charges from the unity value of a pure vacuum. For example, it is observed in the study of the ionosphere that the dielectric constant may be reduced to zero and even reversed in sign by the action of the electrons. The effect is mathematically very complex but it is a function, among others, of the electron density, the frequency of the electric field, and the transit time of the electrons passing through the field. In general, it may be said that if the electrons are projected in a low velocity beam and remain within the electric field for a duration long compared to a cycle of the field frequency, the dielectric constant is decreased by their presence. Contrarily, electrons projected through the electric field at a high velocity in a time short compared to a cycle of the field frequency cause an increase in the dielectric constant. The ionosphere exhibits the former effect while most electron velocity modulating devices exhibit the latter effect since electrons remain in the impressed electric fields for long and short durations, respectively. In the present invention both modes of operation are contemplated, and therefore, operating conditions stated for explanatory purposes are not to be considered in any way to limit the device to the exclusive employment of either high or low velocity electron beams.

Referring now to Fig. 1 there is diagrammatically shown a type of two-resonator tube disclosed in copending application Serial No. 420,770, now U. S. Patent No. 2,439,387 dated April 13, 1948, of which the present application is a further development. As therein shown, the device comprises "buncher" and "catcher" resonators 90 and 91, respectively, containing reentrant members 92, 93 and 92', 93', respectively. The reentrant members 92 and 92' are formed by continuations of a drift tube 94 while members 93 and 93' are portions of a tube 95. The symmetrical placement of the tubes within the resonators is shown by the cross-section view of Fig. 4, of copending application Serial No. 470,678. A cathode 96 is placed in line with the drift tube 94 to enable an electron beam to be projected through the usual grid-shielded apertures in resonator 90 within which the beam is velocity modulated and thence supplied to resonator 91 which the beam excites in the conventional manner. Oscillation is sustained by positive feedback between resonators 91 and 90 consisting of a coaxial lead 76 attached to coupling loops 74 and 75 which couple to the fields of resonators 90 and 91, respectively. A coupling loop 72 and connected coaxial line 73 may be used to supply ultra high frequency power to utilization apparatus. A control grid 68 is interposed between cathode 96 and resonator 90, the conventional use of which as a modulation electrode gives rise to a mixture of amplitude and frequency modulation. The following means are provided to enable the modulation characteristics of the device to be altered at will.

Above resonator 90 is placed a cathode 78 before an entrance grid 80 lying opposite reentrant member 93. Likewise, below resonator 91 is placed a cathode 79 in front of an entrance grid 81 placed opposite reentrant member 93'. Positioned between cathode 78 and entrance grid 80 and between cathode 79 and entrance grid 81 are control grids 82 and 83, respectively. Tube 95 is divided by a transverse wall 97 which is adapted to collect and dissipate the energy of the electrons emitted by cathodes 78 and 79.

A potential source 125, connected to the cathode 96, accelerates the exciting electron beam whose average intensity is adjusted by a variable bias voltage on the control grid 68 obtained from a potentiometer 126 in series with a grid load resistor 127 placed across the voltage source 125. Electron beams from cathodes 78 and 79 are likewise accelerated by a battery 128 across which is connected a potentiometer 129 in series with a grid load resistor 131. Control grids 82 and 83 are maintained at a desired bias voltage by the potentiometer 129. Since the electron beams from cathodes 78 and 79 do not couple with both resonators but are collected on wall 97 after only a single passage through a single resonator, they cannot contribute to the ultra high frequency field though they load the resonators slightly and alter their resonant frequency. Tap 111 on potentiometer 110 supplies the signal voltage to grid 68 while tap 112 on potentiometer 109 supplies the signal voltage to grids 82 and 83.

Substantially pure amplitude or pure frequency modulation may be obtained from the device shown in Fig. 1. A signal wave may be readily impressed on the grids 82 and 83 with an amplitude and phase such that the electron beams from cathodes 78 and 79, respectively, alter the resonant frequency of resonators 90 and 91, respectively, in an opposite direction to the detuning of these resonators by the modulated exciting electron beam and to a substantially equal extent. If the velocities of the exciting and auxiliary beams are greatly different, like changes in beam intensities may have opposite effects on the dielectric constant of the resonators as mentioned above. Under these conditions the modulating and corrective signal waves are impressed on the control grids in like phase in order to cancel frequency modulation. Substantially pure frequency modulation, on the other hand, may be obtained by removing the signal wave from grid 68. If desired, either one of the auxiliary beams may be eliminated and the frequency control accomplished solely in one resonator.

Fig. 2 shows a form of the invention in which auxiliary electron beams are provided in a two-resonator device projecting substantially transversely of the electric fields in the resonators. A cathode 163 emits an electron beam which is employed to excite resonators 164 and 165 in the well known manner. Cathodes 166 and 167 provide electron beams in resonators 164 and 165, respectively, which pass transversely between the grid structures 168 and 169, respectively, and thus contribute no energy to these resonators. Grids 171, 172, 173 are positioned before cathodes 163, 166 and 167, respectively, to control the intensities of the respective beams. Grids 171 and 172 are coupled to taps 111 and 112, respectively, of potentiometers 110 and 109, respectively, while grid 173 is supplied the signal wave from a tap 112′ on a potentiometer 109′ placed in parallel with the potentiometers 109 and 110. It is evident that for any given set of beam velocities the signal waves on the control grids may be adjusted to obtain a minimum of undesired modulation of the generated ultra high frequency wave. Either of the auxiliary beams may be dispensed with if a reduction in the extent of frequency compensation or frequency modulation is immaterial.

Fig. 3 illustrates a conventional two-resonator electron beam velocity modulating device 188 having a "buncher" resonator 189 and a "catcher" resonator 191 to which are coupled by coaxial lines 194 and 195 electronically tuned resonators 192 and 193, respectively. Resonators 192 and 193 have electron beams which may be modulated to vary the impedances coupled to resonators 189 and 191, respectively, thus altering the modulation characteristics of the device 188. If desired, one of the electronic tuning controls 192, 193 may be eliminated and all control effected with a single resonator.

It appears obvious that the teachings of the present invention may be extended to other types of electron beam velocity modulation devices that have radial shooting exciting beams, annular resonators, and similar structural modifications. The usual tuning arrangements may be employed with the illustrated embodiments of the present invention. Great latitude may be exercised in design of resonators, use of smoothing grids, employment of collector electrodes for mixer operation, and in similar engineering decisions.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. High frequency apparatus adapted to produce desired relative amounts of amplitude and frequency modulation, comprising a pair of coupled cavity resonator means, means aligned with said resonator means for projecting an electron beam through both said resonator means to excite electromagnetic oscillations therewithin, means aligned with said resonator means for projecting a respective auxiliary electron beam through each of said resonator means to coact with the oscillations therein without imparting energy to said oscillations, and means aligned with each of said electron beam projecting means for varying the intensities of the electron beams from said several projecting means in accordance with a signal wave, said last-mentioned means being adapted to control the relative amplitudes and phases of said electron beam intensities dependent upon the desired relative amounts of amplitude and frequency modulation.

2. Apparatus for simultaneously producing desired relative amounts of amplitude and frequency modulation ranging from substantially pure amplitude modulation to substantially pure frequency modulation, comprising a pair of cavity resonators, means aligned with said resonators for projecting an electron stream through both of said resonators to excite electromagnetic oscillations therewithin, auxiliary means aligned with said resonators for projecting a respective electron stream to coact with the electromagnetic oscillations within each of said resonators, without imparting energy thereto, and means aligned with said several electron stream projecting means for simultaneously varying the intensities of the electron streams from said several projecting means in accordance with a signal wave, said last-mentioned means being adapted to control the relative amplitude and phases of the electron beam intensities dependent upon the desired relative amounts of amplitude and frequency modulation.

3. In an electron beam velocity modulation discharge tube having buncher and catcher resonators coupled to produce ultra high frequency oscillations when excited by an electron beam projected therethrough, the combination comprising means aligned with the path of said electron beam for varying the intensity of said exciting electron beam in accordance with a signal, means aligned with said resonators for projecting a respective auxiliary electron beam through each of said resonators, and means aligned with said last named means for varying the intensities of said auxiliary beams in accordance with said signal to maintain the average electron densities in said resonators substantially constant.

4. High frequency apparatus comprising a pair of hollow cavity resonators each having a plurality of electron-permeable portions, means aligned with some of said portions for projecting a stream of electrons successively through said resonators by way of one of said portions in each of said resonators to produce oscillations in said resonators, means in said apparatus for modulating said oscillations comprising means aligned with said electron stream projecting means for controlling said stream in accordance with a modulating signal, and means in said apparatus for controlling the modulation of said oscillations, comprising means aligned with another of said portions for projecting a second stream of electrons through said first resonator through another of its electron-permeable portions, means aligned with another of said portions for projecting a third stream of electrons through the second of said resonators by way of another of its electron-permeable portions, and means aligned with said second and third electron stream projecting means for controlling said second and third streams by said signal.

5. High frequency apparatus comprising a pair of coupled cavity resonators, means aligned with said resonators for projecting an electron stream successively through both said resonators, means aligned with said last named means for controlling said electron stream in accordance with a predetermined signal, means in said apparatus for producing a pair of auxiliary electron beams coupled respectively to said resonators, and means aligned with said last named means for controlling said auxiliary beams by said signal.

6. Apparatus as in claim 5, wherein said penultimate means comprises a pair of auxiliary resonators coupled respectively to said first pair of resonators, and means for projecting said auxiliary beams respectively through said auxiliary resonators.

7. High frequency modulation control apparatus, comprising a pair of coupled hollow cavity resonators, means aligned with said resonators for projecting a first electron stream through said resonators to sustain oscillations therein, a pair of auxiliary resonators coupled respectively to said first-mentioned pair of resonators, a pair of electron stream producing electrodes, each of said electrodes being aligned with one of said auxiliary resonators for projecting separate electron streams through each of said auxiliary resonators, a control electrode intermediate said first means and said coupled resonators for controlling the density of said first electron stream in accordance with a modulation signal to produce modulation of said oscillations, and a pair of auxiliary control electrodes, each of said auxiliary electrodes being located intermediate one of said electron stream producing electrodes and the auxiliary resonator in alignment therewith for controlling the density of the respective auxiliary streams by said signal to modify said modulations.

8. High frequency modulation apparatus comprising a pair of coupled cavity resonators, means aligned with said resonators for projecting an electron stream through said resonators to produce oscillations therein, a pair of auxiliary resonators coupled respectively to said first pair of resonators, separate electron stream producing electrodes adjacent each of said auxiliary resonators for projecting a pair of auxiliary electron streams respectively through said auxiliary resonators, and means aligned with said electrodes for controlling the density of said auxiliary streams by a modulating signal.

9. Apparatus for effecting frequency modulation comprising a velocity-modulation discharge device having a pair of resonators coupled together for the generation of oscillations, a source of modulating potentials and means coupled with said source and with said resonators and actuated by voltages from said source for varying the tuning of both of the resonators simultaneously at the modulation frequency so as to effect frequency modulation of the generated oscillations.

10. In an ultra high frequency signalling system, a velocity modulated discharge system including a pair of resonators and electron stream producing electrodes adjacent thereto for passing an electron stream therethrough, feed back couplings between said resonators for the generation of oscillations of ultra high frequency, a variable impedance coupled to each of said resonators, a source of modulating voltage and apparatus coupled to said source and to said variable impedances and adapted to be actuated by modulating voltage from said source for varying said impedances simultaneously in accordance with variations in the magnitude of the modulating voltage.

11. A signalling system as recited in claim 10 wherein said feed back couplings between said resonators for the generation of oscillations include a loop in each resonator and a coupling between said loops.

12. A system as recited in claim 10 wherein said variable impedances each comprise a loop in the resonator and wherein said loops are each coupled with a variable reactance and wherein said reactances are varied simultaneously in accordance with variations in the magnitude of the modulating voltage.

13. In combination, a pair of coupled cavity resonators, means aligned with said resonators for projecting an electron stream through said resonators to produce oscillations therein, means adjacent said resonators for producing a pair of auxiliary electron beams, means intercoupling said last named means with said resonators for coupling said auxiliary beams respectively to said resonators, and a pair of control electrodes, each control electrode being located in one of said auxiliary beams for controlling the density of the electron stream therein.

WILLIAM W. HANSEN.
RUSSELL H. VARIAN.

REFERENCES CITED

The following references are of record in the file of this patent:

UNITED STATES PATENTS

| Number | Name | Date |
|---|---|---|
| 2,261,130 | Applegate | Nov. 4, 1941 |
| 2,280,824 | Hansen et al. | Apr. 28, 1942 |
| 2,281,935 | Hansen et al. | May 5, 1942 |
| 2,284,405 | McArthur | May 26, 1942 |
| 2,311,658 | Hansen et al. | Feb. 23, 1943 |
| 2,317,140 | Gibson | Apr. 20, 1943 |
| 2,320,860 | Fremlin | June 1, 1943 |
| 2,338,237 | Fremlin | Jan. 4, 1944 |
| 2,381,320 | Tawney | Aug. 7, 1945 |
| 2,406,370 | Hansen et al. | Aug. 28, 1946 |
| 2,407,667 | Kircher | Sept. 17, 1946 |
| 2,416,283 | Bowen | Feb. 25, 1947 |
| 2,464,549 | Barford | Mar. 15, 1949 |

FOREIGN PATENTS

| Number | Country | Date |
|---|---|---|
| 114,102 | Australia | Oct. 22, 1941 |
| 541,631 | Great Britain | Dec. 4, 1941 |